(12) United States Patent
Anderson et al.

(10) Patent No.: US 12,159,311 B1
(45) Date of Patent: Dec. 3, 2024

(54) IDENTIFYING TARGETED TRANSACTIONS

(71) Applicant: Wells Fargo Bank, N.A., San Francisco, CA (US)

(72) Inventors: Jill D. Anderson, Waterloo, IL (US); Vincent Alan Dwyer, Saint Peters, MO (US); Daniel F. Prebish, St Louis, MO (US); Robert Joseph Kobbeman, Highland, IL (US)

(73) Assignee: Wells Fargo Bank, N.A., San Francisco, CA (US)

( * ) Notice: Subject to any disclaimer, the term of this patent is extended or adjusted under 35 U.S.C. 154(b) by 120 days.

(21) Appl. No.: 17/660,480

(22) Filed: Apr. 25, 2022

(51) Int. Cl.
*G06Q 40/04* (2012.01)
(52) U.S. Cl.
CPC .................... *G06Q 40/04* (2013.01)
(58) Field of Classification Search
CPC ...................................................... G06Q 40/04
See application file for complete search history.

(56) References Cited

U.S. PATENT DOCUMENTS

| | | | |
|---|---|---|---|
| 8,473,858 B2 | 6/2013 | Buchanan et al. | |
| 10,909,608 B2 | 2/2021 | Chang et al. | |
| 11,244,406 B1 | 2/2022 | Lopez et al. | |
| 2001/0051907 A1 | 12/2001 | Kumar et al. | |
| 2013/0073366 A1 | 3/2013 | Heath | |
| 2015/0038578 A1* | 2/2015 | Campbell | G06F 17/30 |
| 2016/0148316 A1 | 5/2016 | Keld et al. | |
| 2017/0200220 A1 | 7/2017 | Nicholson et al. | |
| 2020/0211065 A1 | 7/2020 | Govindarajalu et al. | |
| 2022/0254340 A1* | 8/2022 | Navarro | G10L 15/22 |

FOREIGN PATENT DOCUMENTS

| | | | | |
|---|---|---|---|---|
| CN | 111681098 | * | 9/2020 | ............ G06Q 40/03 |

OTHER PUBLICATIONS

Haria, et al., in "MOD: Minimally Ordered Durable Datastructures for Persistent Memory," from ASPLOS'20, Mar. 16-20, 2020 (Year: 2020).*
Sirimevan, Naadun, "Stock Market Prediction Using Machine Learning Techniques", 2019 International Conference on Advancements in Computing (ICAC), (2019), 6 pgs.

* cited by examiner

*Primary Examiner* — Olabode Akintola
*Assistant Examiner* — Brandon M Duck
(74) *Attorney, Agent, or Firm* — SCHWEGMAN LUNDBERG & WOESSNER, P.A.

(57) ABSTRACT

Various examples are directed to systems and methods for identifying targeted transactions from a transaction data stream. A transaction monitoring application executes on at least one processor. The transaction monitoring application may access first targeted transaction data from a targeted transaction persistent storage. The transaction monitoring application may build a first targeted transaction data structure at an application memory. The transaction monitoring application may access a first transaction record from a transaction record data stream and compare the first targeted transaction data structure and the first transaction record. The transaction monitoring application may, based on the comparing, determine that the first transaction is a targeted transaction, and initiate sending of a first transaction report message to a first user.

20 Claims, 9 Drawing Sheets

IDENTIFYING TARGETED TRANSACTIONS

BACKGROUND

Computing technology permits the automated or semi-automated processing of large numbers of transactions, such as transactions in stocks and other securities. Computer processing of transactions increase the volume capacity and accuracy of transaction execution.

DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings.

DETAILED DESCRIPTION

Figure 1:
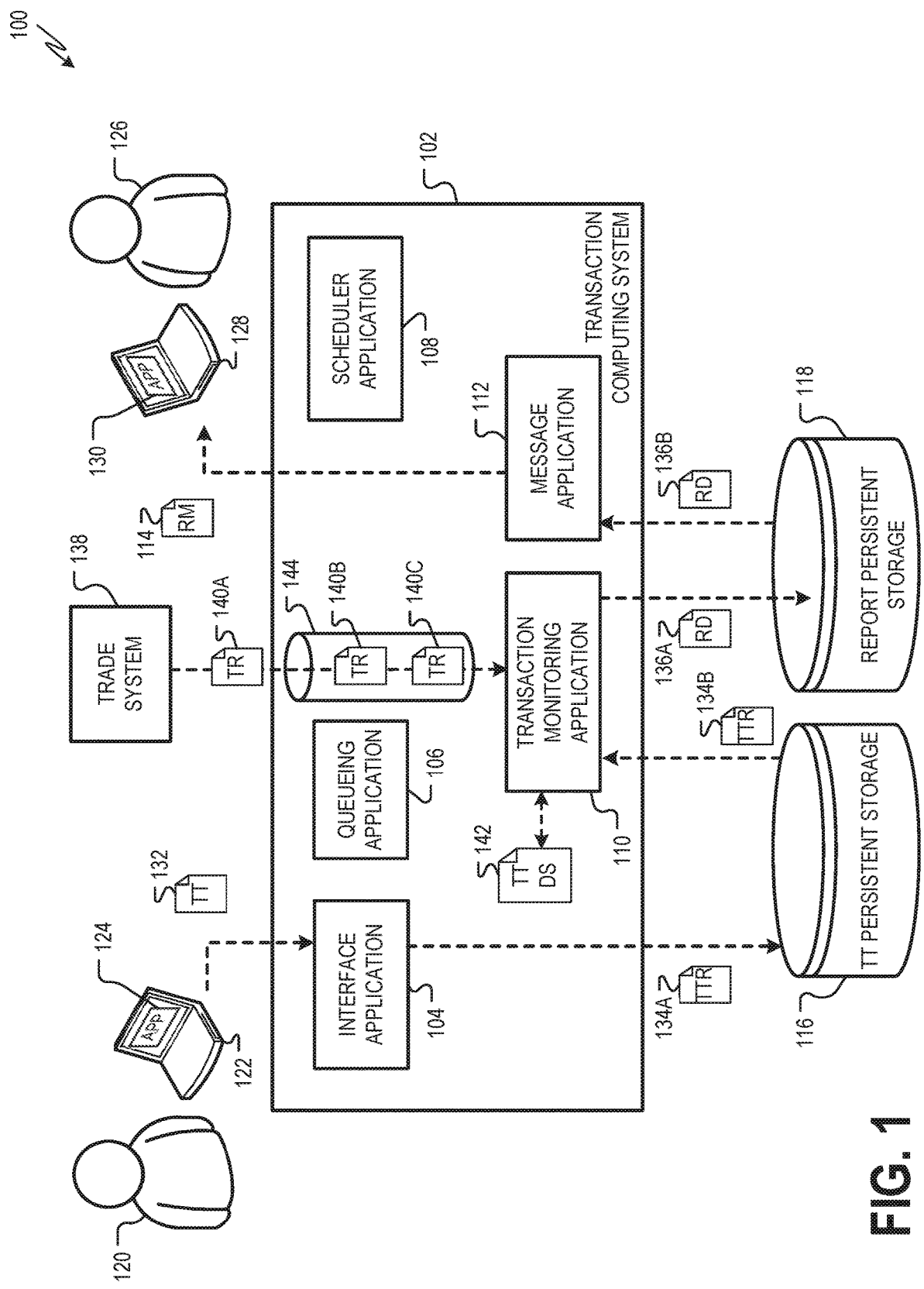
FIG. 1 is a diagram showing one example of an environment for identifying targeted transactions.

Various examples are directed to systems and methods for detecting targeted transactions from a transaction data stream. For example, a financial institution may initiate transactions on behalf of its clients, such as securities transactions. The financial institution may hold clients' assets, such as securities, cash, and the like, in client accounts. When a client authorizes a transaction, the financial institution may initiate the requested transaction using the client account. For example, when a client authorizes a transaction to sell securities from the client's account, the financial institution may initiate a transaction to sell the indicated securities. When a client authorizes a transaction to purchase securities, the financial institution may initiate a transaction to make the requested purchase (e.g., using cash or other assets from the client's account) and hold the purchased securities in the client's account.

The financial institution may institute a transaction on behalf of a client using an exchange or third-party execution company. The financial institution may send a transaction request to the exchange or execution company. In response, the exchange or execution company executes the transaction, for example, by matching the transaction request with a suitable counterparty and transferring ownership of the securities or other assets. Upon execution, the exchange or execution company provides the financial institution with transaction record data describing the transaction including, for example, the account associated with the relevant financial institution client and an indicator of the securities or other assets that were purchased and/or sold.

There are some circumstances where it is desirable for the financial institution to identify certain executed transactions from a stream of transaction records. For example, some transactions trigger special reporting and/or record keeping. Consider an example transaction in a security on behalf of a client who holds a position of control at the entity that issued the security. For example, the client may be a director, officer, or other control person at the issuing entity. To avoid insider trading and other undesirable market conditions, securities regulatory schemes in some jurisdictions call for control people to report transactions in securities, such as stock, issued by entities that they control. For example, 17 CFR § 230.144, promulgated by the Securities and Exchange Commission (SEC) of the United States (often referred to as Rule 144), sets forth reporting conditions and reports to be submitted when a client transacts in securities when that client is a control person at the issuing entity. When such a transaction occurs, the client and/or the financial institution may submit a report to the relevant regulatory agency describing the transaction.

In another example, some jurisdictions provide a "safe harbor" and/or affirmative defense against improper insider trading for clients who may have insider information about an entity, provided that the client buys and/or sells securities issued by the entity according to a predetermined trading plan. The predetermined trading plan may include selling (and/or buying) securities issued by the entity at a predetermined time and/or according to a predetermined rule. Consider an example predetermined trading plan in which a client periodically sells a predetermined number of shares in a corporation at a specified time (e.g., the third Tuesday of every month), if the strike price of the security is greater than a threshold price. A financial institution, in some examples, can track or otherwise administer a predetermined trading plan on behalf of a client, for example, by keeping records of transactions according to the predetermined trading plan and/or making appropriate reports to the relevant regulatory agency (if such reports are required). One example of a securities regulation establishing predetermined trading plans is 17 CFR § 240.10b-5-1, also promulgated by the SEC.

A financial institution may have a large number of clients requesting a large number of transactions on a given day. In some examples, a single financial institution may have hundreds of thousands or even millions of transactions executed on behalf of clients each day depending on market volume. Further, not every transaction requested for a client is actually executed. For example, some clients may place conditions on transaction requests (e.g., sell X shares of security Y, but only at or above a threshold price). As described herein, some transactions requested according to a predetermined trading plan may be subject to conditions set forth in the predetermined trading plan. Also, the exchange or execution entity may not find a suitable counterparty for every requested transaction.

Accordingly, to detect the execution of targeted transactions, a financial institution may monitor transaction record data received from the exchange, execution entity, or other party. The financial institution may implement a computing system to monitor incoming transaction records and identify targeted transactions (e.g., transactions that are subject to a reporting requirement and/or transactions that are part of a predetermined trading plan). Identifying the targeted transactions may include comparing each transaction record to transaction parameters describing the targeted transactions. For example, transaction parameters may describe combinations of client accounts and securities that trigger reporting and/or predetermined trading plan record keeping.

The potential volume of transaction records, however, can make it technically challenging to effectively analyze the received transactions records and identify targeted transactions. For example, the transaction records may be received at a rate of tens of transaction records per second, or faster in some cases. In some examples, a transaction computing system (e.g., implemented by a financial institution) is configured to store targeted transaction data including targeted transaction parameters at a targeted transaction data structure. The targeted transaction data structure may be stored at a memory, such as a Random Access Memory (RAM) accessible to a transaction monitoring application executing at the transaction computing system. The access time of the memory may be less, and in some examples much less, than the access time of databases, network drives, and other potential storage locations for the targeted transaction data structure. In this way, the transaction monitoring application may quickly access the targeted transaction data structure to compare it to transaction records.

Although storing the targeted transaction data structure at a memory accessible to the transaction monitoring application may increase the speed at which the transaction computing system can process transaction records, it may also create other challenges. For example, it is desirable in some circumstances to update the targeted transaction parameters.

Consider an example in which a financial advisor user for the financial institution becomes aware that a particular client is a control person with respect to one or more securities and/or sets up a predetermined trading plan for the particular client. The financial advisor user may, for example, receive information indicating that the client is a control person directly from the client, from a financial advisor working directly with the client, and/or in other suitable ways. The financial advisor user may add, or generate an update to the targeted transaction parameters for the particular client indicating that transactions in the one or more securities by the particular client are now targeted transactions.

When a user makes a new entry or update to the targeted transaction parameters, it may be desirable to expeditiously begin analyzing incoming transaction records using the new or updated transaction parameters. For example, the client might request a transaction at the same time that it becomes apparent that that client is a control person or has a predetermined trading plan. In this case, it may be desirable to have the transaction monitoring application begin using the new or updated targeted transaction parameters before the requested trade is executed.

In practice, however, this may create challenges. For example, financial advisor users may be at a geographic location different than the location of the transaction computing system. In some examples, different financial advisor users may even be distributed geographically across the country or even across the world. Accordingly, reflected updated transaction targeting parameters at a targeted transaction data structure stored at memory of a transaction monitoring application may be non-trivial.

In some examples, these and other challenges may be addressed by periodically re-starting the transaction monitoring application and using a targeted transaction persistent storage. The targeted transaction persistent storage may be a memory, database, cloud drive, or other similar data storage that is distinct from the memory used by the transaction monitoring application. When a financial advisor user is to make a change to the targeted transaction parameters, one or more interface applications may write the changes to the targeted transaction persistent storage. Because the targeted transaction persistent storage is not accessed by the transaction monitoring application each time that a transaction record is received, changes to the target transaction persistent storage during execution of the transaction monitoring application may not affect the execution of the transaction monitoring application.

Upon startup, the transaction monitoring application may access the transaction persistent storage and retrieve the target transaction parameter data stored there. The transaction monitoring application may use the target transaction parameter data to build the target transaction data structure at the memory of the transaction monitoring application. The transaction monitoring application may be scheduled to run for a threshold time period such as, for example, 10 minutes, 20 minutes, 45 minutes, 60 minutes and/or the like. When the threshold time period has elapsed since start up, the execution of the transaction monitoring application may be stopped. The transaction monitoring application may then be relaunched. Upon relaunch, the transaction monitoring application may rebuild the target transaction data structure from the target transaction persistent storage. In this way, any changes to the target transaction parameters between launches of the transaction monitoring application are implemented by the transaction monitoring application upon relaunch.

FIG. 1 is a diagram showing one example of an environment 100 for identifying targeted transactions. The environment 100 includes a transaction computing system 102. The transaction computing system 102 may be implemented, for example, by a financial institution having clients who request transactions, such as transactions in stocks or other securities. The transaction computing system 102 may be implemented in any suitable manner. For example, FIGS. 8 and 9 herein describe example computing software and hardware architectures that may be used to constitute all or part of the transaction computing system 102. The transaction computing system 102 may be implemented using a single computing device and/or across a number of networked computing devices. The transaction computing system 102 may be implemented, in whole or in part, using one or more an on-premise computing devices. In some examples, the transaction computing system 102 is implemented, in whole or in part, using cloud components, for example, according to an arrangement such as Software as a Service (Saas), Platform as a Service (Paas), Infrastructure as a Service (IaaS) and/or the like.

The environment 100 also shows users 120, 126 who access the transaction computing system 102 via user computing devices 122, 128. The user computing devices 122, 128 may be any suitable computing device or devices such as, for example, a smart phone, a tablet computer, a laptop computer, a smart watch, and the like.

User computing devices 122, 128 comprise input/output (I/O) devices for providing a user interface (UI) to the respective users 120, 126. In some examples, user computing devices 122, 128 execute applications 124, 130 that facilitate interaction with the transaction computing system 102 (e.g., provision of a UI, communications with the transaction computing system 102, and the like). In some examples, the application 124, 130 is a web browser that communicates with the transaction computing system 102 via a web server or similar arrangement. For example, the transaction computing system 102 may, directly or indirectly, provide and/or populate a web page that is displayed through the browser at the user computing devices 122, 128. The users 120, 126 may interact with the transaction computing system 102 via the web page. Also, in some examples, the application 124, 130 is or includes an application that otherwise communicates with the transaction computing system 102. For example, the application 124, 130 may be or include a mobile or other application that includes an embedded web view or other view that receives a document from the transaction computing system 102.

In the example arrangement of FIG. 1, the user 120 provides targeted transaction parameters 132. For example, the user 120 may be a financial advisor user who is a financial advisor for clients and/or is associated with a financial advisor function for the financial institution implementing the transaction computing system 102. In some examples, a financial advisor user is located at central office of the financial institution and supports financial advisors and their clients at a number of branch offices. The user 126 may receive transaction report messages 114 indicating executed transactions that are targeted transactions (e.g., transactions that are subject to a reporting requirement and/or record keeping for a predetermined trading plan). The user 126, in some examples, is a compliance user who is associated with a reporting and/or planning function at the financial institution. For example, as described herein, the user 126 may initiate applicable reports for executed transactions by clients who are control people and/or may initiate applicable record keeping for executed transactions that are part of a predetermined trading plan. Although two users 120, 126 and two user computing devices 122, 128 are shown in FIG. 1, in some examples, different numbers of users may be supported. For example, in some examples, a single user may both provide targeted transaction parameters 132 and receive the transaction report messages 114. Also, in some examples, multiple users (not shown) may provide targeted transaction parameters 132 and/or receive transaction report messages 114.

The environment 100 also includes targeted transaction persistent storage 116 and report persistent storage 118. The persistent storage 116, 118 may be or include any sort of persistent storage such as, for example, on-premises drives, cloud storage, and/or the like. In some examples, one or more of the persistent storages 116, 118 may be or include a database or databases. In some examples, the targeted transaction persistent storage 116 and/or report persistent storage 118 may be or include a table stored at a database. In some examples, the targeted transaction persistent storage 116 and report persistent storage 118 are or include different tables stored at a common database.

The environment 100 also includes a trade system 138. The trade system 138 may be a computing system, for example, implemented by an exchange, execution entity, or other similar party to provide transaction records 140A, 140B, 140C to the transaction computing system 102. The trade system 138 may be or include any suitable computing device or devices at a single geographic location and/or distributed across multiple geographic locations.

The user 120 may provide targeted transaction parameters 132 to the transaction computing system 102, for example, via a UI provided by the user computing device 122 via the application 124. The transaction computing system 102 may execute an interface application 104. The interface application 104 may, for example, provide a UI to the user 120 via the user computing device 122 and application 124. The user 120 may provide targeted transaction parameters 132 via the UI. The interface application 104 may store received sets of targeted transaction parameters as a targeted transaction record 134A at the targeted transaction persistent storage 116.

The targeted transaction record 134A may include a set of targeted transaction parameters describing a transaction type that is a targeted transaction. For example, when the targeted transaction relates to transactions by a control person, the targeted transaction record 134A may describe a client or client account and a security or securities for which the corresponding client is a control person. In examples where the targeted transaction relates to a predetermined trading plan, the targeted transaction record 134A may describe a client or client account and a security or securities that are the subject of a predetermined trading plan for the client. The targeted transaction record 134A, in some examples, is written as a row at a table of the targeted transaction persistent storage 116.

A transaction monitoring application 110 may also execute at the transaction computing system 102. When it is launched, the transaction monitoring application 110 may access targeted transaction records 134A, 134B at the targeted transaction persistent storage 116 and generate a targeted transaction data structure 142. In examples where the targeted transaction persistent storage 116 is or includes a database table or tables, accessing the targeted transaction records 134A, 134B may include querying the tables and/or accessing a database view that includes data from the table or tables.

The transaction monitoring application 110 may generate the targeted transaction data structure 142 at a memory location, such as RAM or similar memory, that is accessible to the transaction monitoring application 110. For example, an operating system at a device, virtual machine (VM) or container executing the transaction monitoring application 110 may assign memory space to the transaction monitoring application 110. The transaction monitoring application 110 may build the targeted transaction data structure 142 at the assigned memory space.

The transaction monitoring application 110 may also receive transaction records 140A, 140B, 140C as shown. The transaction monitoring application 110 may compare the transaction records 140A, 140B, 140C to targeted transaction data structure 142 stored at the memory. For example, the targeted transaction data structure 142 may comprise targeted transaction parameters from the targeted transaction records 134A, 134B. Comparing a transaction record 140A, 140B, 140C to the targeted transaction data structure 142 may comprise determining whether the executed transaction described by the transaction record 140A, 140B, 140C meets any of the targeted transaction parameters set forth in the targeted transaction data structure 142. Because the targeted transaction data structure 142 is stored at the memory location, as described, the transaction monitoring application 110 may be able to quickly load the targeted transaction parameters from the targeted transaction data structure 142 to perform the comparison for each transaction record 140A, 140B, 140C.

If the transaction monitoring application 110 determines that a transaction record 140A, 140B, 140C describes a targeted transaction, it may initiate a transaction report message 114 describing that transaction. The transaction report message 114 may include an identifier of the executed transaction and, in some examples, an indication of why the executed transaction is a targeted transaction.

There are various different ways that the transaction monitoring application 110 can initiate the transaction report message 114. In some examples, the transaction monitoring application 110 can generate the transaction report message 114 and request that an e-mail server or other suitable messaging server provide the transaction report message 114 to the user 126. In other examples, the transaction monitoring application 110 may generate report data 136A and write the report data 136A to report persistent storage 118. In some examples, writing to a persistent storage, such as the persistent storage 118, may not delay the processing of transaction records 140A, 140B, 140C as much as reading from a persistent storage, such as the targeted transaction persistent storage 116. For example, when writing report data 136A to the report persistent storage 118, the transaction monitoring application 110 need not wait for the write to occur before moving to the next transaction record 140A, 140B, 140C.

A message application 112 executing at the transaction computing system 102 may read report data 136A, 136B written to the report persistent storage 118 by the transaction monitoring application 110. The message application 112 may cause the report data 136A, 136B to be provided as the transaction report message 114 to the user 126. In some examples, the transaction monitoring application 110 writes the report data 136A, 136B in a format that can be all or part of the transaction report message 114. In these examples, the message application 112 may retrieve the report data 136A, 136B and provide them to a mail server, Short Message Service (SMS) server, or other suitable message tool that sends the report data 136A, 136B to the user 126 as a transaction report message 114.

In some examples, the transaction computing system implements a queue 144 of transaction records 140A, 140B, 140C received from the trade system 138. The queue 144, in some examples, is managed by a queuing application. The queuing application 106 may receive transaction records 140A, 140B, 140C provided by the trade system 138. As a transaction record 140A, 140B, 140C is received, the queuing application 106 writes the transaction record 140A, 140B, 140C to a position at the queue 144 (e.g., at a beginning of the queue). When the transaction monitoring application 110 is ready to process a next transaction record 140A, 140B, 140C, it may retrieve a transaction record 140A, 140B, 140C from an end of the queue 144. While the transaction monitoring application 110 is not executing, transaction records 140A, 140B, 140C may continue to be received by the queuing application 106 and placed in the queue 144. In this way, transaction records 140A, 140B, 140C received while the transaction monitoring application 110 is not executing may be preserved and processed when the transaction monitoring application again launches.

Figure 2:
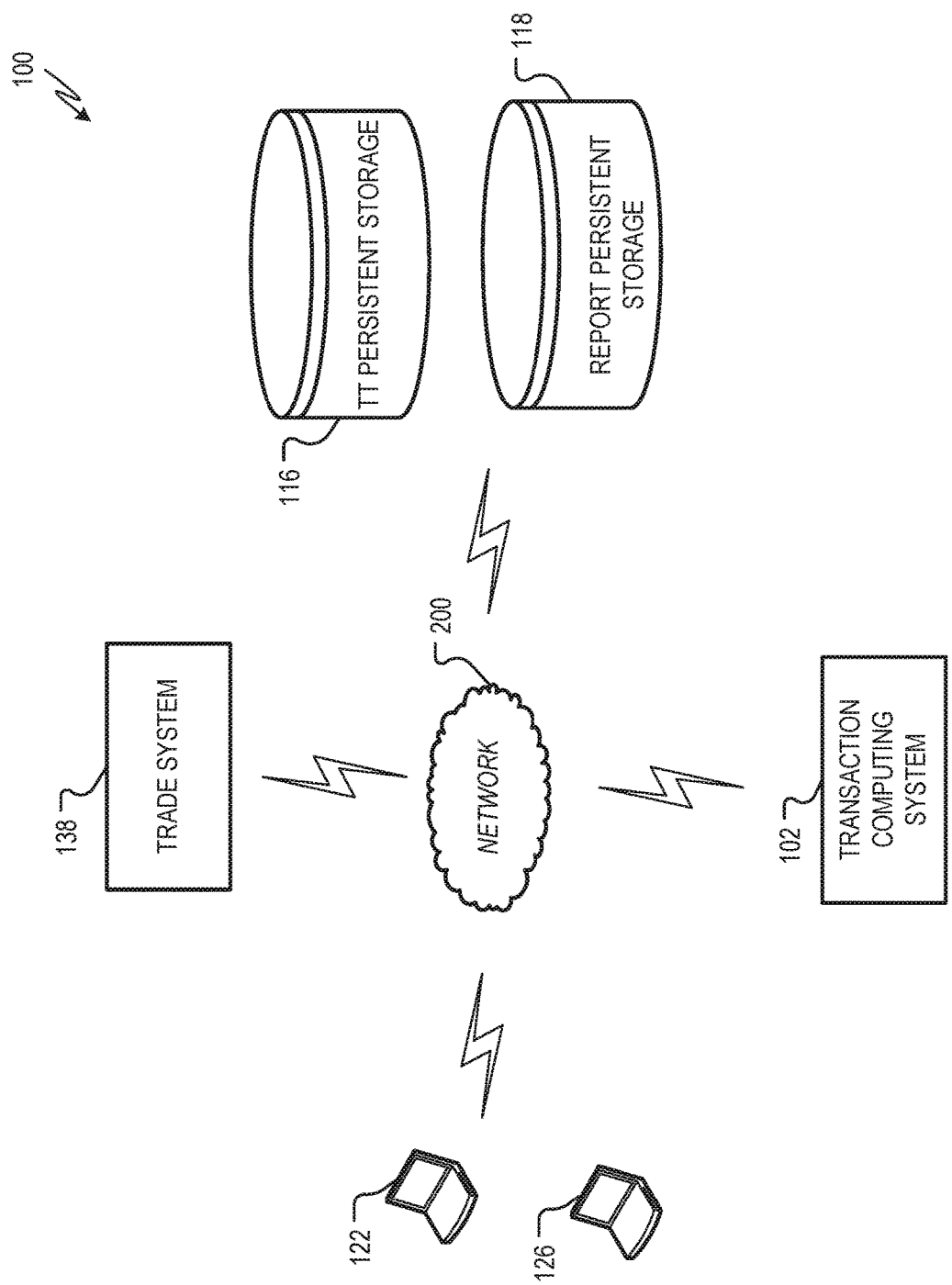
FIG. 2 is a diagram showing another example of the environment of FIG. 1 including additional details.

FIG. 2 is a diagram showing another example of the environment 100 including additional details. In the example of FIG. 2, the user computing devices 122, 126, the transaction computing system 102, the persistent storages 116, 118, and the trade system 138 are in communication with one another via a network 200. It will be appreciated that some or all of the applications 104, 106, 108, 110, 112 may be implemented at portions of the transaction computing system 102 that are remote from one another. Accordingly, some or all of the applications 104, 106, 108, 110, 112 may also be in communication with each other and/or with other components of the environment 100 via the network 200.

The network 200 may be or comprise any suitable network element operated according to any suitable network protocol. For example, one or more portions of the network 200 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, another type of network, a combination of two or more such networks, and so forth.

Figure 3:
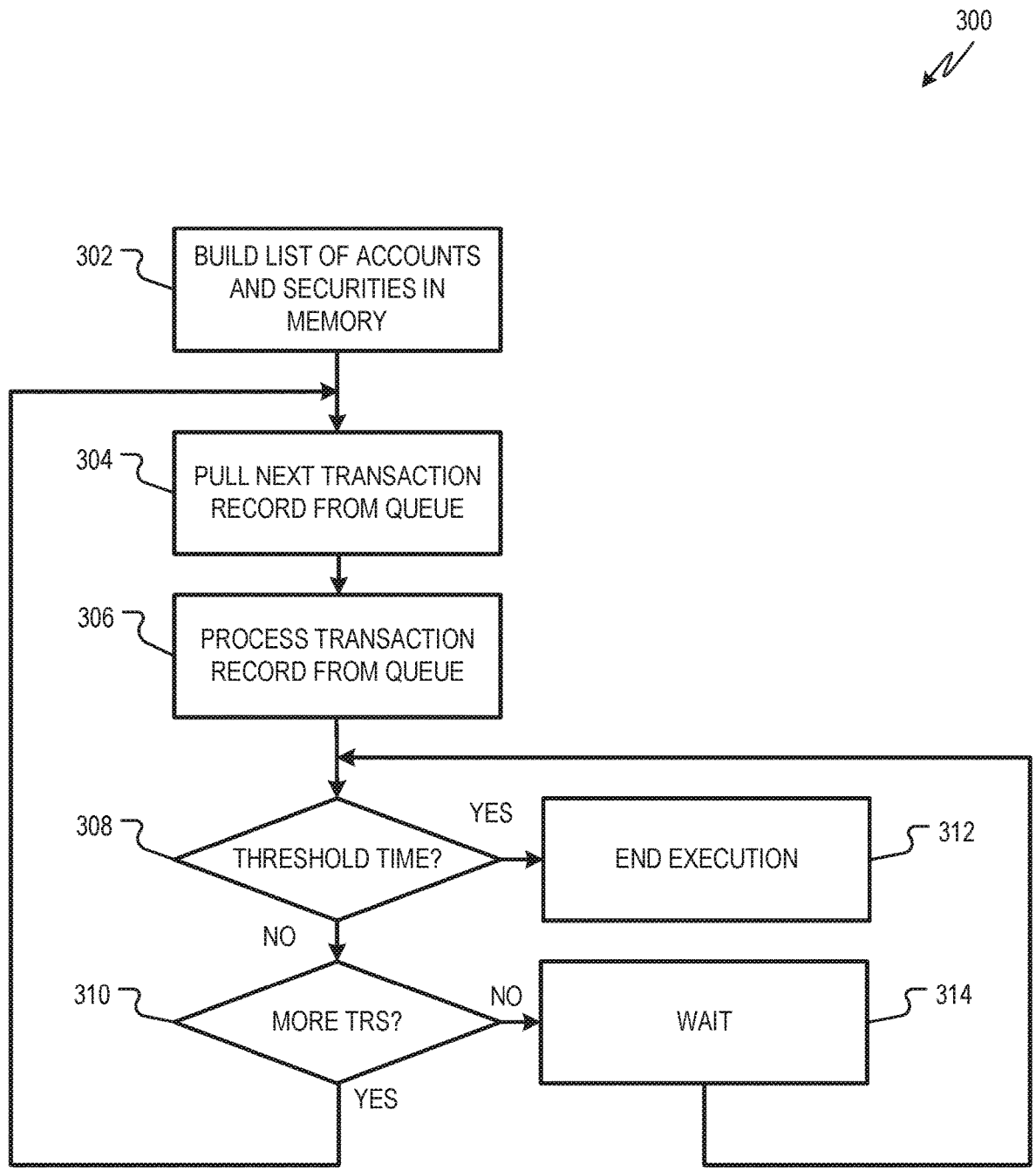
FIG. 3 is a flowchart showing one example of a process flow that may be executed by the transaction monitoring application to process transaction records.

FIG. 3 is a flowchart showing one example of a process flow 300 that may be executed by the transaction monitoring application 110 to process transaction records 140A, 140B, 140C. For example, the process flow 300 may be executed by the transaction monitoring application 110 upon launch (e.g., by the scheduler application 108 or other suitable management function at the transaction computing system 102.

At operation 302, the transaction monitoring application 110 builds the targeted transaction data structure 142 at an associated memory. This may include, for example, accessing one or more targeted transaction records 134A, 134B at the targeted transaction persistent storage 116. For example, the transaction monitoring application 110 may query the targeted transaction persistent storage 116 to provide a table, view, or other data arrangement including various targeted transaction records 134A, 134B describing targeted transactions to be identified. The transaction monitoring application 110 writes the targeted transaction parameters indicated by the targeted transaction records 134A, 134B to the targeted transaction data structure 142 at the memory. In this way, the transaction monitoring application 110 may only need to access the targeted transaction persistent storage 116 once at startup and/or may not need to access the targeted transaction persistent storage 116 for each considered transaction record 140A, 140B, 140C.

At operation 304, the transaction monitoring application 110 pulls the next transaction record 140A, 140B, 140C from the transaction queue 144. In some examples, the transaction monitoring application 110 pulls the transaction record 140A, 140B, 140C that is at an end of the queue (e.g., the record that has been in the queue the longest). At operation 306, the transaction monitoring application 110 processes the transaction record 140A, 140B, 140C pulled from the transaction queue 144. Processing the transaction record 140A, 140B, 140C may include comparing the transaction described by the transaction record 140A, 140B, 140C to the targeted transaction data structure 142, as described herein, for example, at FIG. 4. If the considered transaction record 140A, 140B, 140C describes a targeted transaction, the result of processing the transaction record 140A, 140B, 140C may include initiating a transaction report message 114, for example, by writing report data 136A, 136B to the report persistent storage 118.

At operation 308, the transaction monitoring application 110 determines if the threshold time for its execution has elapsed since its launch. If the threshold time has passed, the transaction monitoring application 110 may end its execution at operation 312. If the threshold time has not elapsed since its launch, the transaction monitoring application 110 may determine, at operation 310, of there are any transaction records 140A, 140B, 140C remaining at the transaction queue 144. If there are no more transaction records 140A, 140B, 140C remaining at the transaction queue 144, the transaction monitoring application 110 may wait for a predetermined period at operation 314. The predetermined period may be, for example, one hundred milliseconds, one second, one minute, two minutes, or any other suitable time. After waiting at operation 312, the transaction monitoring application 110 may return to operation 306. If there are additional transaction records 140A, 140B, 140C at the transaction queue 144, the transaction monitoring application 110 may return to operation 304 and pull the next transaction record 140A, 140B, 140C from the transaction queue 144.

Figure 4:
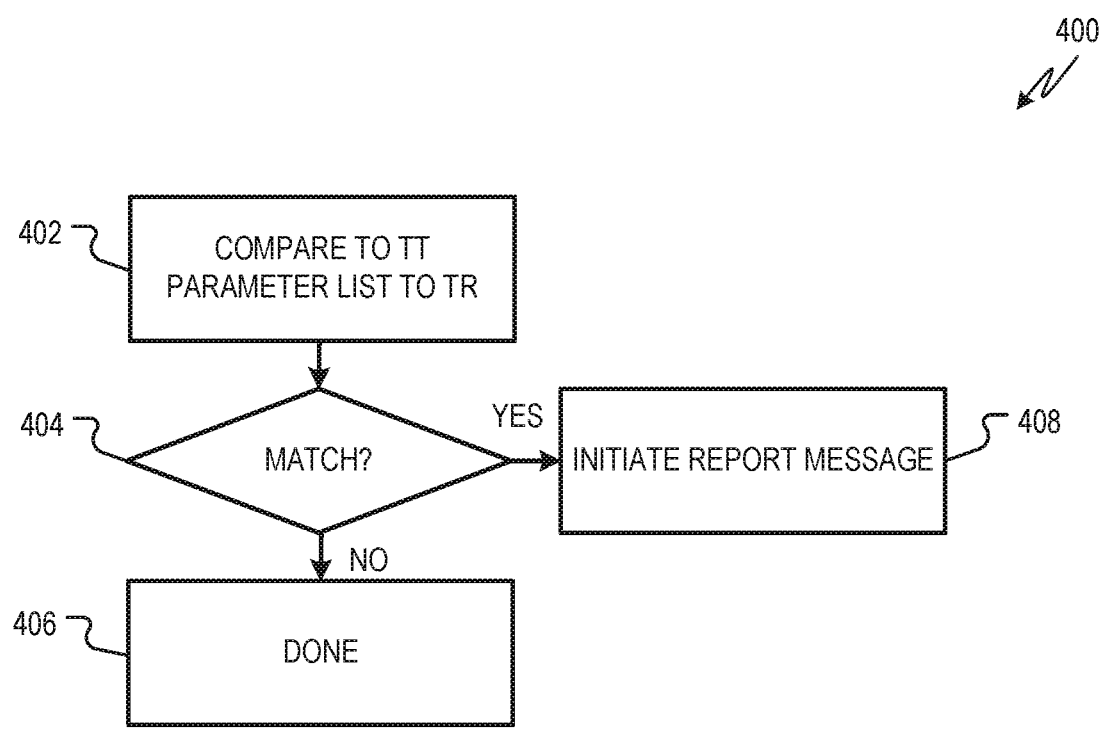
FIG. 4 is a flowchart showing one example of a process flow that may be executed by the transaction monitoring application to determine whether a transaction record describes a targeted transaction.

FIG. 4 is a flowchart showing one example of a process flow 400 that may be executed by the transaction monitoring application 110 to determine whether a transaction record 140A, 140B, 140C describes a targeted transaction. For example, the process flow 400 shows one example way that the transaction monitoring application 110 can execute operation 306 of the process flow 300 of FIG. 3. The process flow 400 may be executed, for example, after a transaction record 140A, 140B, 140C is pulled from the transaction queue 144.

At operation 402, the transaction monitoring application 110 may compare the transaction record 140A, 140B, 140C to the targeted transaction data structure 142. This may include comparing the transaction record 140A, 140B, 140C to each set of targeted transaction criteria described by the targeted transaction data structure 142. Consider an example in which the targeted transaction data structure 142 indicates a set of targeted transaction criteria including security A and a client account Z as targeted transactions. The transaction monitoring application 110 may determine whether the transaction record 140A, 140B, 140C describes a transaction in security A that was executed on behalf of client account Z. This may be repeated for all sets of targeted transaction criteria described by the targeted transaction data structure.

At operation 404, the transaction monitoring application 110 determines if the transaction described by the transaction record 140A, 140B, 140C matched any of the sets of targeted transaction criteria described by the targeted transaction data structure. If there was a match, then the transaction monitoring application 110 may initiate a transaction report message at operation 408. The transaction report message may indicate the transaction described by the transaction record 140A, 140B, 140C. In some examples, the transaction report message also indicates the set of targeted transaction criteria matching the transaction. In some examples, initiating the transaction report message may include writing report data 136A, 136B to the report persistent storage 118. If there is no match at operation 404, the transaction monitoring application may complete the comparison of the transaction record 140A, 140B, 140C and the targeted transaction data structure 142 at operation 406.

Figure 5:
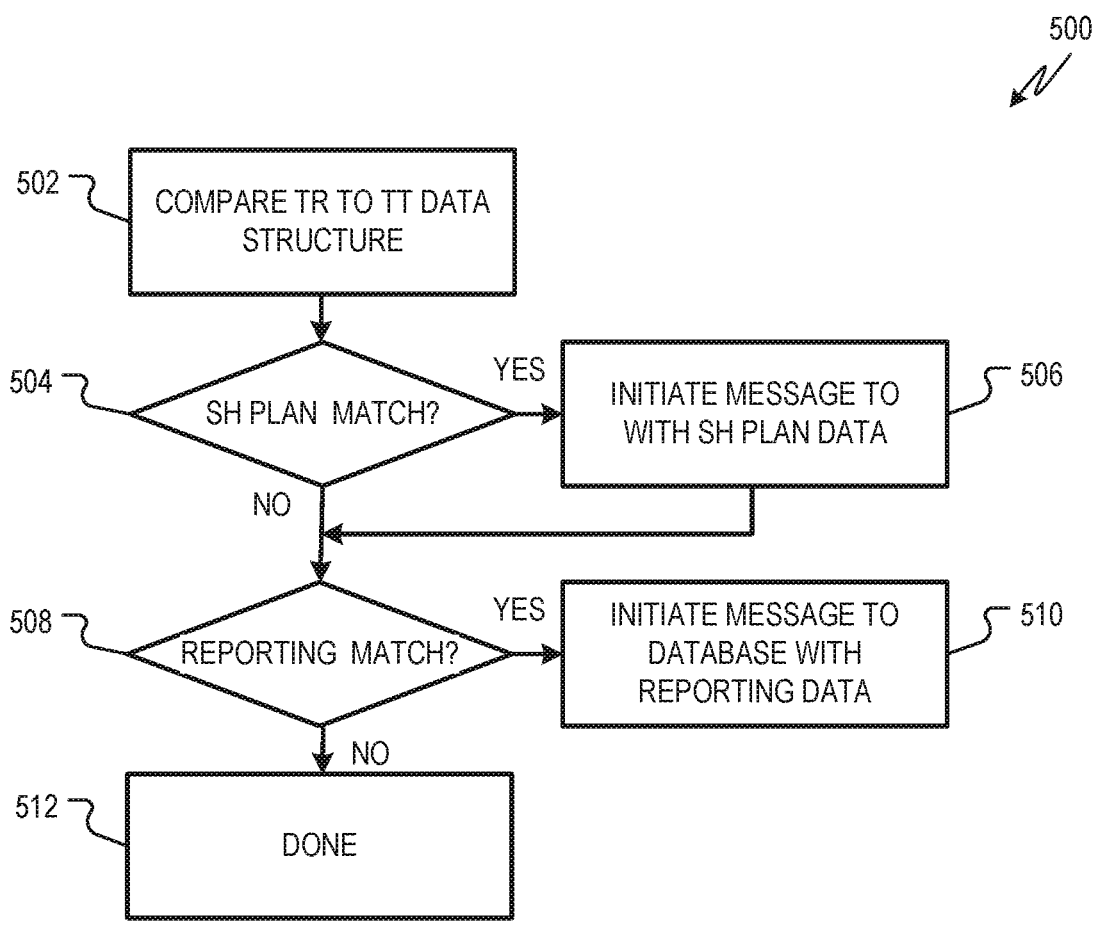
FIG. 5 is a flowchart showing one example of a process flow that may be executed by the transaction monitoring application to determine whether a transaction record describes a targeted transaction.

FIG. 5 is a flowchart showing one example of a process flow 500 that may be executed by the transaction monitoring application 110 to determine whether a transaction record 140A, 140B, 140C describes a targeted transaction. In the example of FIG. 5, the transaction monitoring application 110 creates transaction report messages that indicate the reason that a targeted transaction is a targeted transaction. For example the targeted transaction parameters may indicate the reason that a transaction is targeted, such as, for example to trigger reporting when reporting is required, for example if the client is a control person, or to trigger record keeping for example associated with a predetermined trading plan. The indication of why transactions meeting particular sets of targeted transaction parameters are targeted may be written to the targeted transaction data structure 142 and used by the transaction monitoring application 110.

The process flow 500 may be executed after the transaction monitoring application 110 has pulled a transaction record 140A, 140B, 140C from the transaction queue 144. At operation 502 the transaction monitoring application 110 compares the transaction record 140A, 140 B, 140C to the targeted transaction data structure 142 as described herein. At operation 504, the transaction monitoring application 110 determines if the transaction described by the transaction record 140A, 140B, 140C matches any of the sets of targeted transaction criteria indicating a predetermined trading plan stored at the targeted transaction data structure 142. If the transaction described by the transaction record 140A, 140B, 140C matches one of the sets of targeted transaction criteria indicating a predetermined trading plan, the transaction monitoring application 110 may, at operation 506, initiate a transaction report message that indicates the transaction and includes predetermined trading plan data indicating that a record related to a predetermined trading plan may be needed for the transaction.

If the transaction described by the transaction record 140A, 140B, 140C does not match one of the sets of targeted transaction criteria indicating a predetermined trading plan, or after initiating the message with the predetermined trading plan data, the transaction monitoring application 110 may determine, at operation 508, whether the transaction matches any of the sets of targeted transaction criteria indicating a potential reporting requirement. If a match is found, the transaction monitoring application 110 may, at operation 510, initiate a transaction report message that indicates the transaction and includes reporting data indicating that a reporting requirement might apply to the transaction. In some examples, if a transaction matches both a set of targeted transaction criteria indicating a predetermined trading plan and a set of targeted transaction criteria indicating a potential reporting requirement, the transaction monitoring application 110 may send one transaction report message 114 including both the predetermined trading plan data and the reporting data. If there is no match at operation 504 or at operation 508, the transaction monitoring application 110 may conclude processing of the transaction record 140A, 140B, 140C at operation 512.

Figure 6:
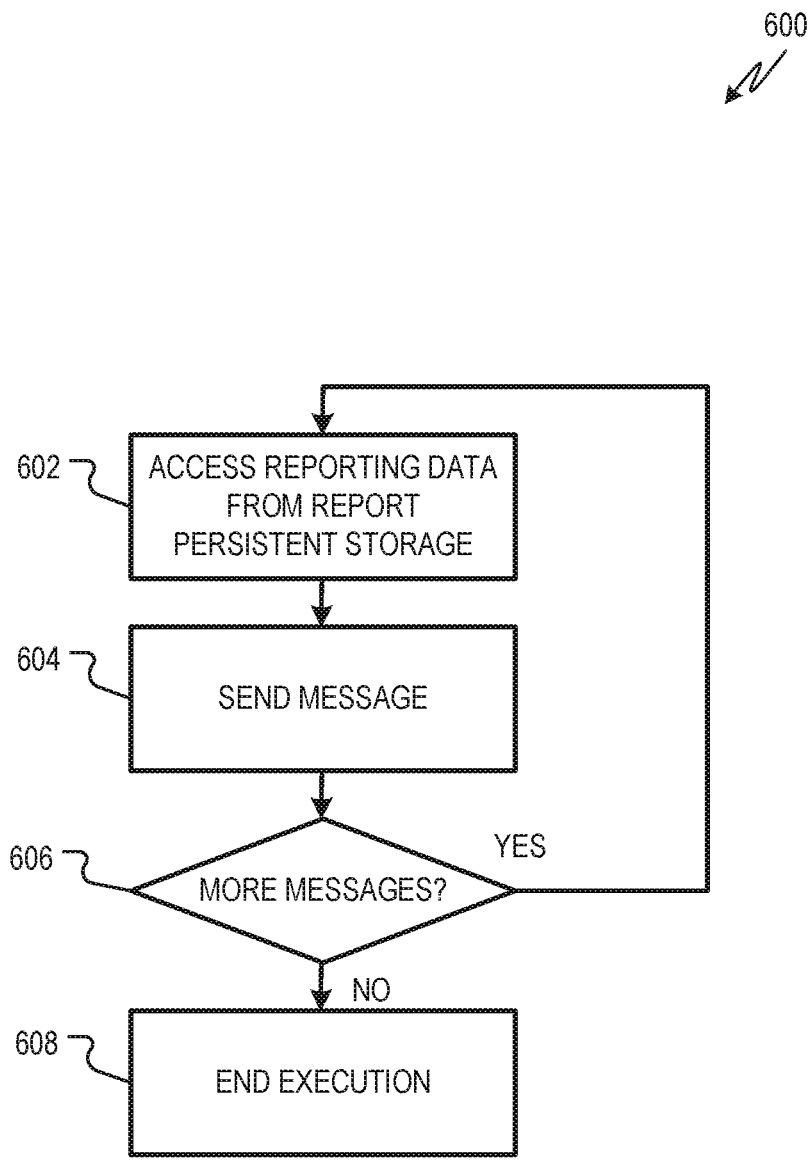
FIG. 6 is a flowchart showing one example of a process flow that may be executed by the message application to send transaction report messages to a user.

FIG. 6 is a flowchart showing one example of a process flow 600 that may be executed by the message application 112 to send transaction report messages 114 to the user 126. For example, the message application 112 may execute the process flow 600 when it is launched by or at the direction of the scheduler application 108.

At operation 602 the message application 112 may access an instance of report data 136A, 136B from the report persistent storage 118. For example, the report data 136A, 136B may have been written to the report persistent storage 118 by the transaction monitoring application 110 upon detecting a targeted transaction as described herein. At operation 604, the message application 112 may send the report data 136A, 136B to the user 126 as a transaction report message 114. In some examples the transaction monitoring application 110 determines a proper recipient of the transaction report message 114 at the time that the reporting data 136A, 136B is written to the report persistent storage 118. For example the recipient of the transaction report message 114 may be indicated by the set of targeted transaction criteria that was matched to the transaction. Sending the message at operation 604 may include forwarding the reporting data 136A, 136B to an email client, SMS client, or other suitable hardware or software component for sending the transaction report message 114.

At operation 606 the message application 112 determines whether there are additional instances of reporting data 136A, 136B stored at the report persistent storage 118 to be sent to the user 126. If there are additional instances of reporting data 136A, 136B, the message application 112 may return to operation 602 and access the next instance of reporting data 136A, 136B from the report persistent storage 118. If there are no additional instances of reporting data 136A, 136B at the report persistent storage 118 sending, the message application 112 may end its execution at operation 608.

Figure 7:
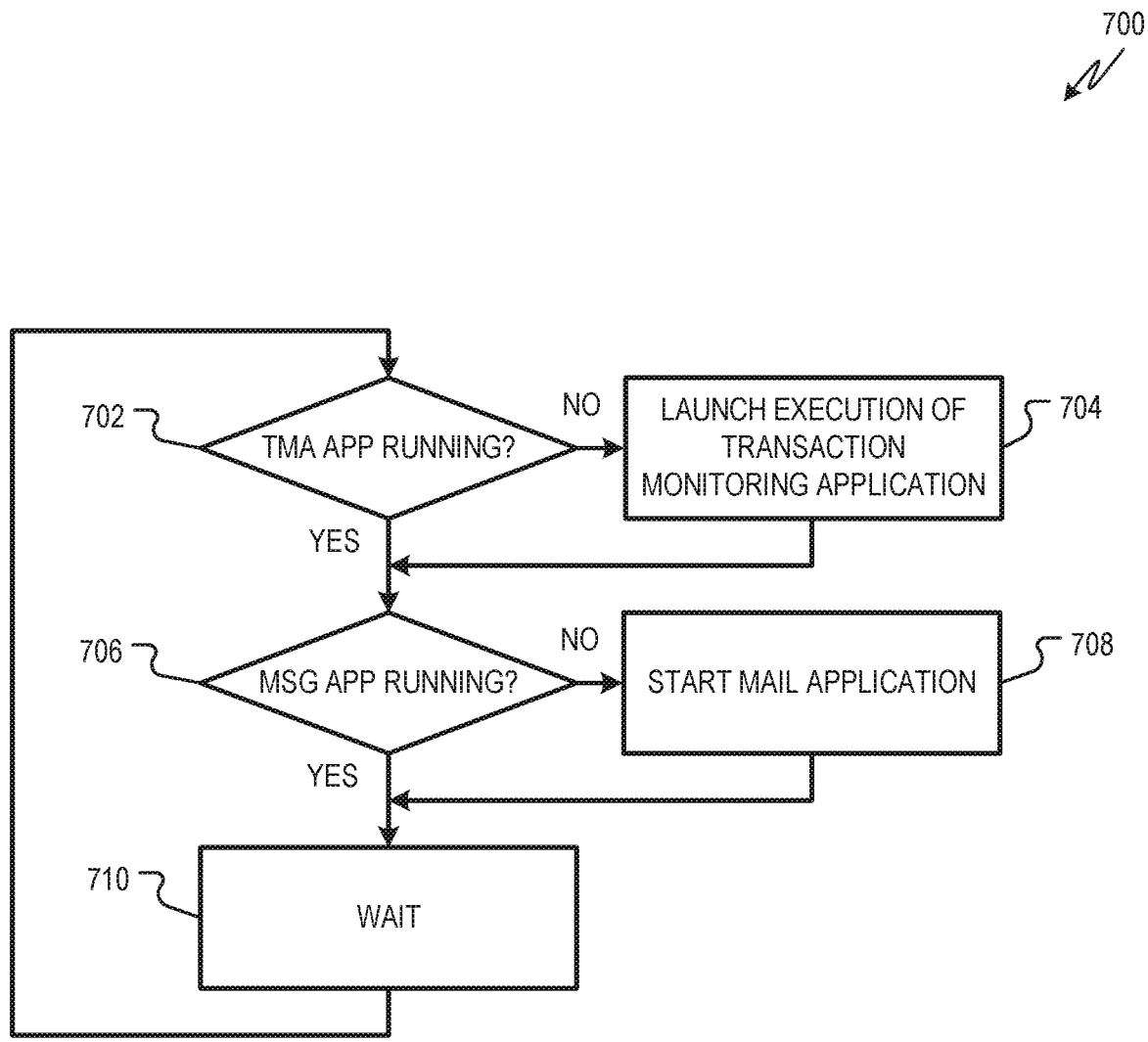
FIG. 7 is a flowchart showing one example of a process flow that may be executed by the scheduler application to schedule execution of the transaction monitoring application and the message application.

FIG. 7 is a flowchart showing one example of a process flow 700 that may be executed by the scheduler application 108 to schedule execution of the transaction monitoring application 110 and the message application 112. At operation 702 the scheduler application 108 may determine if the transaction monitoring application 110 is running. If the transaction monitoring application 110 is not running, the scheduling application 108 may launch execution of the transaction monitoring application 110 at operation 704.

If the transaction monitoring application is running at operation 702, or after launching execution of the transaction monitoring application at operation 704, the scheduler application 108 may determine, at operation 706, whether the message application 112 is running. If the message application 112 is not running, the scheduler application 108 may launch execution of the message application 112 at operation 708.

If the message application is running at operation 706 or after launching execution of the message application at operation 708, the scheduler application 108 may wait at operation 710 until a predetermined interval of time has elapsed. The predetermined interval of time may be any suitable interval of time such as, for example, 30 seconds, 1 minute, 5 minutes, 10 minutes, 30 minutes, and the like. After the interval of time has elapsed, the scheduler application 108 may return to operation 702. In this way, the scheduler application 108 may check to determine whether to launch the transaction monitoring application 110 and the message application 112 once each time the interval of time has elapsed. Accordingly, when the transaction monitoring application 110 stops its execution, it may only be stopped for about the interval of time associated with the scheduler application 108. When the transaction monitoring application 110 is relaunched by the scheduler application 108, it may rebuild the targeted transaction data structure 142 as described herein. The rebuilt targeted transaction data structure 142 may include any changes to the targeted transaction criteria that were incorporated at the targeted transaction persistent storage 116 since the previous time that the transaction monitoring application 110 was launched.

Figure 8:
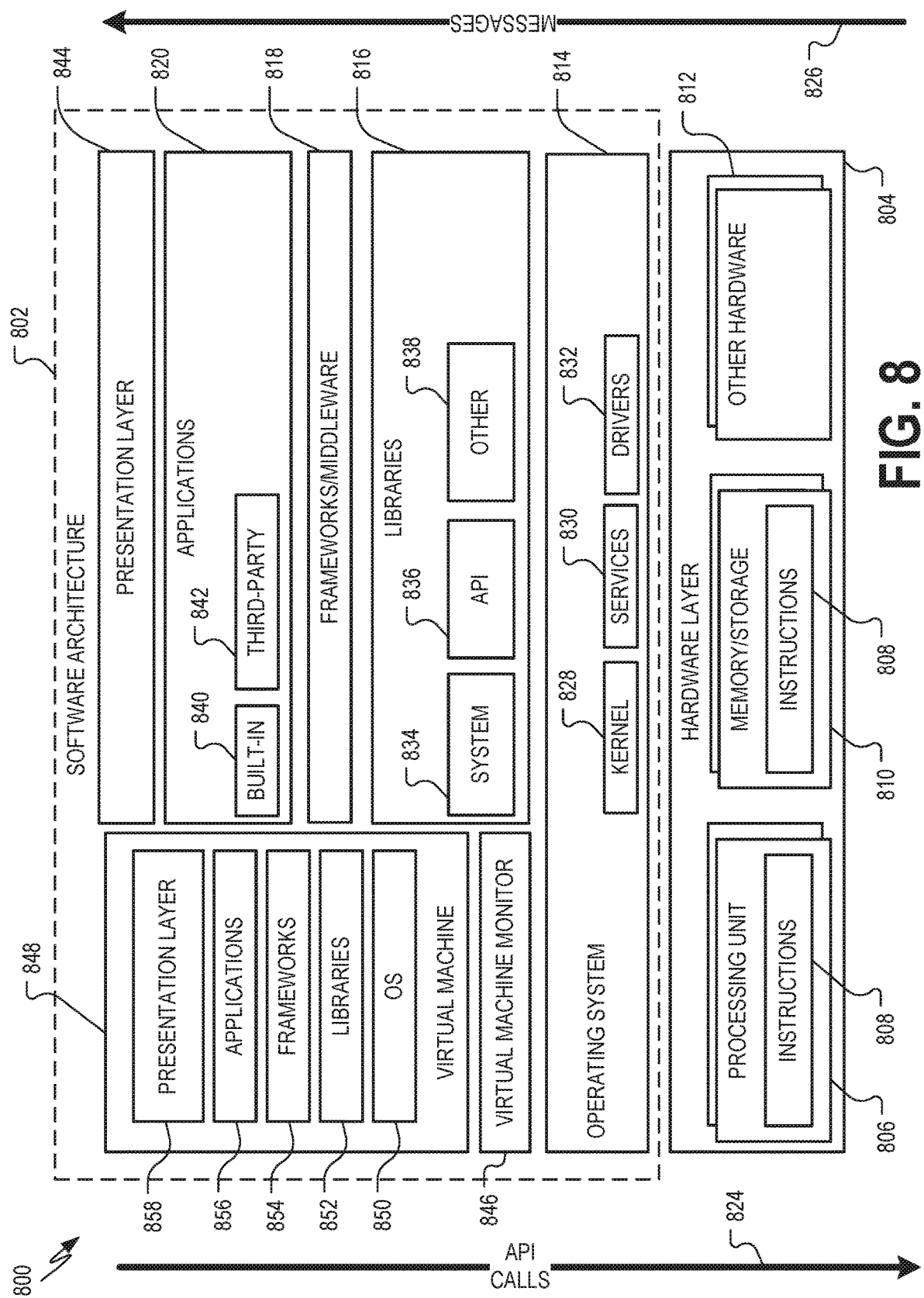
FIG. 8 is a block diagram showing one example of a software architecture for a computing device.

FIG. 8 is a block diagram 800 showing one example of a software architecture 802 for a computing device. The software architecture 802 may be used in conjunction with various hardware architectures, for example, as described herein. FIG. 8 is merely a non-limiting example of a software architecture 802, and many other architectures may be implemented to facilitate the functionality described herein. A representative hardware layer 804 is illustrated and can represent, for example, any of the above-referenced computing devices. In some examples, the hardware layer 804 may be implemented according to an architecture 900 of FIG. 9.

The representative hardware layer 804 comprises one or more processing units 806 having associated executable instructions 808. The executable instructions 808 represent the executable instructions of the software architecture 802, including implementation of the methods, modules, components, and so forth of FIGS. 1-10. The hardware layer 804 also includes memory and/or storage modules 810, which also have the executable instructions 808. The hardware layer 804 may also comprise other hardware 812, which represents any other hardware of the hardware layer 804, such as the other hardware illustrated as part of the architecture 900.

In the example architecture of FIG. 8, the software architecture 802 may be conceptualized as a stack of layers where each layer provides particular functionality. For example, the software architecture 802 may include layers such as an operating system 814, libraries 816, middleware layer 818, applications 820, and a presentation layer 844. Operationally, the applications 820 and/or other components within the layers may invoke application programming interface (API) calls 824 through the software stack and receive a response, returned values, and so forth illustrated as messages 826 in response to the API calls 824. The layers illustrated are representative in nature and not all software architectures have all layers. For example, some mobile or special-purpose operating systems may not provide a middleware layer 818, while others may provide such a layer. Other software architectures may include additional or different layers.

The operating system 814 may manage hardware resources and provide common services. The operating system 814 may include, for example, a kernel 828, services 830, and drivers 832. The kernel 828 may act as an abstraction layer between the hardware and the other software layers. For example, the kernel 828 may be responsible for memory management, processor management (e.g., scheduling), component management, networking, security settings, and so on. The services 830 may provide other common services for the other software layers. In some examples, the services 830 include an interrupt service. The interrupt service may detect the receipt of a hardware or software interrupt and, in response, cause the software architecture 802 to pause its current processing and execute an interrupt service routine (ISR) when an interrupt is received. The ISR may generate an alert.

The drivers 832 may be responsible for controlling or interfacing with the underlying hardware. For instance, the drivers 832 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 816 may provide a common infrastructure that may be utilized by the applications 820 and/or other components and/or layers. The libraries 816 typically provide functionality that allows other software modules to perform tasks in an easier fashion than by interfacing directly with the underlying operating system 814 functionality (e.g., kernel 828, services 830, and/or drivers 832). The libraries 816 may include system libraries 834 (e.g., C standard library) that may provide functions such as memory allocation functions, string manipulation functions, mathematic functions, and the like. In addition, the libraries 816 may include API libraries 836 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 816 may also include a wide variety of other libraries 838 to provide many other APIs to the applications 820 and other software components/modules.

The middleware layer 818 (also sometimes referred to as frameworks) may provide a higher-level common infrastructure that may be utilized by the applications 820 and/or other software components/modules. For example, the middleware layer 818 may provide various graphical UI functions, high-level resource management, high-level location services, and so forth. The middleware layer 818 may provide a broad spectrum of other APIs that may be utilized by the applications 820 and/or other software components/modules, some of which may be specific to a particular operating system or platform.

The applications 820 include built-in applications 840 and/or third-party applications 842. Examples of representative built-in applications 840 may include, but are not limited to, a contacts application, a browser application, a book reader application, a location application, a media application, a messaging application, and/or a game application. The third-party applications 842 may include any of the built-in applications 840 as well as a broad assortment of other applications. In a specific example, the third-party application 842 (e.g., an application developed using the Android™ or iOS™ software development kit (SDK) by an entity other than the vendor of the particular platform) may be mobile software running on a mobile operating system such as iOS™, Android™, Windows® Phone, or other computing device operating systems. In this example, the third-party application 842 may invoke the API calls 824 provided by the mobile operating system such as the operating system 814 to facilitate functionality described herein.

The applications 820 may utilize built-in operating system functions (e.g., kernel 828, services 830, and/or drivers 832), libraries (e.g., system libraries 834, API libraries 836, and other libraries 838), or middleware layer 818 to create UIs to interact with users of the system. Alternatively, or additionally, in some systems, interactions with a user may occur through a presentation layer, such as the presentation layer 844. In these systems, the application/module "logic" can be separated from the aspects of the application/module that interact with a user.

Some software architectures utilize virtual machines. For example, systems described herein may be executed utilizing one or more virtual machines executed at one or more server computing machines. In the example of FIG. 8, this is illustrated by a virtual machine 848. A virtual machine creates a software environment where applications/modules can execute as if they were executing on a hardware computing device. The virtual machine 848 is hosted by a host operating system (e.g., the operating system 814) and typically, although not always, has a virtual machine monitor 846, which manages the operation of the virtual machine 848 as well as the interface with the host operating system (e.g., the operating system 814). A software architecture executes within the virtual machine 848, such as an operating system 850, libraries 852, frameworks/middleware 854, applications 856, and/or a presentation layer 858. These layers of software architecture executing within the virtual machine 848 can be the same as corresponding layers previously described or may be different.

Figure 9:
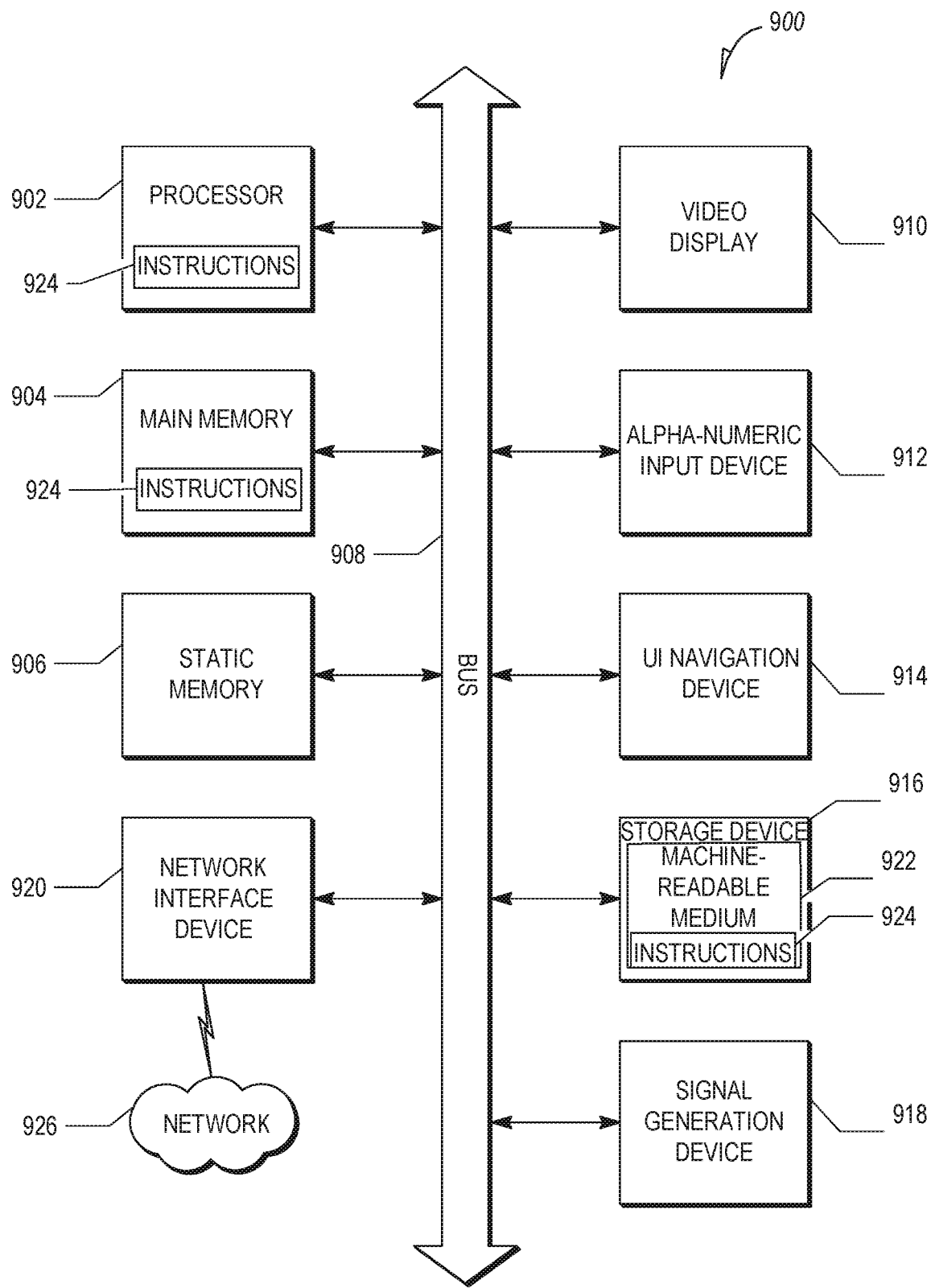
FIG. 9 is a block diagram illustrating a computing device hardware architecture, within which a set or sequence of instructions can be executed to cause a machine to perform examples of any one of the methodologies discussed herein.

FIG. 9 is a block diagram illustrating a computing device hardware architecture 900, within which a set or sequence of instructions can be executed to cause a machine to perform examples of any one of the methodologies discussed herein. The architecture 900 may describe, for example, any of the computing devices and/or control circuits described herein. The architecture 900 may execute the software architecture 802 described with respect to FIG. 8. The architecture 900 may operate as a standalone device or may be connected (e.g., networked) to other machines. In a networked deployment, the architecture 900 may operate in the capacity of either a server or a client machine in server-client network environments, or it may act as a peer machine in peer-to-peer (or distributed) network environments. The architecture 900 can be implemented in a personal computer (PC), a tablet PC, a hybrid tablet, a set-top box (STB), a personal digital assistant (PDA), a mobile telephone, a web appliance, a network router, a network switch, a network bridge, or any machine capable of executing instructions (sequential or otherwise) that specify operations to be taken by that machine.

The example architecture 900 includes a processor unit 902 comprising at least one processor (e.g., a central processing unit (CPU), a graphics processing unit (GPU), or both, processor cores, compute nodes, etc.). The architecture 900 may further comprise a main memory 904 and a static memory 906, which communicate with each other via a link 908 (e.g., a bus). The architecture 900 can further include a video display unit 910, an alphanumeric input device 912 (e.g., a keyboard), and a UI navigation device 914 (e.g., a mouse). In some examples, the video display unit 910, alphanumeric input device 912, and UI navigation device 914 are incorporated into a touchscreen display. The architecture 900 may additionally include a storage device 916 (e.g., a drive unit), a signal generation device 918 (e.g., a speaker), a network interface device 920, and one or more sensors (not shown), such as a GPS sensor, compass, accelerometer, or other sensor.

In some examples, the processor unit 902 or another suitable hardware component may support a hardware interrupt. In response to a hardware interrupt, the processor unit 902 may pause its processing and execute an ISR, for example, as described herein.

The storage device 916 includes a machine-readable medium 922 on which is stored one or more sets of data structures and instructions 924 (e.g., software) embodying or utilized by any one or more of the methodologies or functions described herein. The instructions 924 can also reside, completely or at least partially, within the main memory 904, within the static memory 906, and/or within the processor unit 902 during execution thereof by the architecture 900, with the main memory 904, the static memory 906, and the processor unit 902 also constituting machine-readable media. The instructions 924 stored at the machine-readable medium 922 may include, for example, instructions for implementing the software architecture 802, instructions for executing any of the features described herein, etc.

While the machine-readable medium 922 is illustrated in an example to be a single medium, the term "machine-readable medium" can include a single medium or multiple media (e.g., a centralized or distributed database, and/or associated caches and servers) that store the one or more instructions 924. The term "machine-readable medium" shall also be taken to include any tangible medium that is capable of storing, encoding, or carrying instructions for execution by the machine and that cause the machine to perform any one or more of the methodologies of the present disclosure, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM) and electrically erasable programmable read-only memory (EEPROM)) and flash memory devices; magnetic disks such as internal hard disks and removable disks; magneto-optical disks; and CD-ROM and DVD-ROM disks.

The instructions 924 can further be transmitted or received over a communications network 926 using a transmission medium via the network interface device 920 utilizing any one of a number of well-known transfer protocols (e.g., hypertext transfer protocol (HTTP)). Examples of communication networks include a LAN, a WAN, the Internet, mobile telephone networks, plain old telephone service (POTS) networks, and wireless data networks (e.g., Wi-Fi, 7G, and 6G LTE/LTE-A or WiMAX networks). The term "transmission medium" shall be taken to include any intangible medium that is capable of storing, encoding, or carrying instructions for execution by the machine, and includes digital or analog communications signals or other intangible media to facilitate communication of such software.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative and not restrictive. For example, the above-described examples (or one or more aspects thereof) can be used in combination with others. Other embodiments can be used, such as by one of ordinary skill in the art upon reviewing the above description. The Abstract is to allow the reader to quickly ascertain the nature of the technical disclosure, for example, to comply with 77 C.F.R. § 1.72 (b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein, as embodiments can feature a subset of said features. Further, embodiments can include fewer features than those disclosed in a particular example. Thus, the following claims are hereby incorporated into the Detailed Description, with each claim standing on its own as a separate embodiment. The scope of the embodiments disclosed herein is to be determined with reference to the appended claims, along with the full scope of equivalents to which such claims are entitled.

What is claimed is:

1. A system for identifying targeted transactions from a transaction data stream, the system comprising:
    at least one processor programmed to perform operations comprising:
    launching a transaction monitoring application to execute on the at least one processor;
    accessing, by the transaction monitoring application, first targeted transaction data from a targeted transaction persistent storage, the first targeted transaction data describing targeted transaction parameters;
    building, by the transaction monitoring application, a first targeted transaction data structure at an application memory accessible to the transaction monitoring application, the first targeted transaction data structure comprising at least a portion of the targeted transaction parameters described by the first targeted transaction data, the application memory being a random access memory (RAM);
    accessing, by the transaction monitoring application, a first transaction record from a transaction record data stream, the first transaction record describing a first executed transaction;
    comparing, by the transaction monitoring application, the first transaction record and the first targeted transaction data structure stored at the application memory;
    based on the comparing, determining, by the transaction monitoring application, that the first executed transaction is a targeted transaction;
    sending a first transaction report message to a first user, the first transaction report message describing the first executed transaction;
    determining that a first threshold time has elapsed since the launching of the transaction monitoring application;
    responsive to the determining that the first threshold time has elapsed since the launching of the transaction monitoring application, stopping execution of the transaction monitoring application;
    after the stopping of the execution of the transaction monitoring application, relaunching the transaction monitoring application;
    after the relaunching of the transaction monitoring application, accessing, by the transaction monitoring application, second targeted transaction data from the targeted transaction persistent storage, the second targeted transaction data describing at least one targeted transaction data that differs from the targeted transaction parameters described by the first targeted transaction data;
    building, by the transaction monitoring application, a second targeted transaction data structure comprising at least a portion of the targeted transaction parameters described by the second targeted transaction data; and
    storing, by the transaction monitoring application, the second targeted transaction data structure to a memory location.

2. The system of claim 1, the operations further comprising:
    executing an interface application at the at least one processor;
    receiving, by the interface application, an indication of at least one targeted transaction parameter; and
    writing, by the interface application, the at least one targeted transaction parameter to the targeted transaction persistent storage.

3. The system of claim 1, the sending of the first transaction report message comprising:
    writing, by the transaction monitoring application, first transaction report data to a report persistent storage;
    launching a message application to execute on the at least one processor;
    reading, by the message application and from the report persistent storage, the first transaction report data;

generating, by the message application, the first transaction report message using the first transaction report data; and initiating, by the message application, sending of the first transaction report message.

4. The system of claim 1, the operations further comprising:
   periodically determining, by a scheduler application, whether the transaction monitoring application is executing; and
   when the transaction monitoring application is not executing, initiating, by the scheduler application, the launching of the transaction monitoring application.

5. The system of claim 1, the operations further comprising:
   accessing, by a queuing application and from a transaction execution system, the transaction record data stream; and
   generating, by the queuing application, a transaction record queue, the accessing of the first transaction record by the transaction monitoring application comprising accessing the transaction record queue.

6. The system of claim 1, the targeted transaction parameters described by the first targeted transaction data comprising an indication of a first account and an indication of a first security.

7. The system of claim 6, the determining that the first executed transaction is a targeted transaction comprising:
   determining that the first executed transaction was for the first account; and
   determining that the first executed transaction was included the first security.

8. A computerized method for identifying targeted transactions from a transaction data stream, the method comprising:
   launching a transaction monitoring application to execute on at least one processor;
   accessing, by the transaction monitoring application, first targeted transaction data from a targeted transaction persistent storage, the first targeted transaction data describing targeted transaction parameters;
   building, by the transaction monitoring application, a first targeted transaction data structure at an application memory accessible to the transaction monitoring application, the first targeted transaction data structure comprising at least a portion of the targeted transaction parameters described by the first targeted transaction data, the application memory being a random access memory (RAM);
   accessing, by the transaction monitoring application, a first transaction record from a transaction record data stream, the first transaction record describing a first executed transaction;
   comparing, by the transaction monitoring application, the first transaction record and the first targeted transaction data structure stored at the application memory stored at the application memory;
   based on the comparing, determining, by the transaction monitoring application, that the first executed transaction is a targeted transaction;
   sending a first transaction report message to a first user, the first transaction report message describing the first executed transaction;
   determining that a first threshold time has elapsed since the launching of the transaction monitoring application;
   responsive to the determining that the first threshold time has elapsed since the launching of the transaction monitoring application, stopping execution of the transaction monitoring application;

after the stopping of the execution of the transaction monitoring application, relaunching the transaction monitoring application;

after the relaunching of the transaction monitoring application, accessing, by the transaction monitoring application, second targeted transaction data from the targeted transaction persistent storage, the second targeted transaction data describing at least one targeted transaction data that differs from the targeted transaction parameters described by the first targeted transaction data;

building, by the transaction monitoring application, a second targeted transaction data structure comprising at least a portion of the targeted transaction parameters described by the second targeted transaction data; and storing, by the transaction monitoring application, the second targeted transaction data structure to a memory location.

9. The computerized method of claim 8, further comprising:
   executing an interface application at the at least one processor;
   receiving, by the interface application, an indication of at least one targeted transaction parameter; and
   writing, by the interface application, the at least one targeted transaction parameter to the targeted transaction persistent storage.

10. The computerized method of claim 8, the sending of the first transaction report message comprising:
    writing, by the transaction monitoring application, first transaction report data to a report persistent storage;
    launching a message application to execute on the at least one processor;
    reading, by the message application and from the report persistent storage, the first transaction report data;
    generating, by the message application, the first transaction report message using the first transaction report data; and
    initiating, by the message application, sending of the first transaction report message.

11. The computerized method of claim 8, further comprising:
    periodically determining, by a scheduler application, whether the transaction monitoring application is executing; and
    when the transaction monitoring application is not executing, initiating, by the scheduler application, the launching of the transaction monitoring application.

12. The computerized method of claim 8, further comprising:
    accessing, by a queuing application and from a transaction execution system, the transaction record data stream; and
    generating, by the queuing application, a transaction record queue, the accessing of the first transaction record by the transaction monitoring application comprising accessing the transaction record queue.

13. The computerized method of claim 8, the targeted transaction parameters described by the first targeted transaction data comprising an indication of a first account and an indication of a first security.

14. The computerized method of claim 13, the determining that the first executed transaction is a targeted transaction comprising:

determining that the first executed transaction was for the first account; and determining that the first executed transaction was included the first security.

15. A non-transitory machine-readable medium comprising instructions thereon that, when executed by at least one processor, cause the at least one processor to perform operations comprising:

launching a transaction monitoring application to execute on at least one processor;

accessing, by the transaction monitoring application, first targeted transaction data from a targeted transaction persistent storage, the first targeted transaction data describing targeted transaction parameters;

building, by the transaction monitoring application, a first targeted transaction data structure at an application memory accessible to the transaction monitoring application, the first targeted transaction data structure comprising at least a portion of the targeted transaction parameters described by the first targeted transaction data, the application memory being a random access memory (RAM);

storing, by the transaction monitoring application, the first targeted transaction data structure to a memory location;

accessing, by the transaction monitoring application, a first transaction record from a transaction record data stream, the first transaction record describing a first executed transaction;

comparing, by the transaction monitoring application, the first transaction record and the first targeted transaction data structure stored at the application memory;

based on the comparing, determining, by the transaction monitoring application, that the first executed transaction is a targeted transaction;

sending a first transaction report message to a first user, the first transaction report message describing the first executed transaction;

determining that a first threshold time has elapsed since the launching of the transaction monitoring application;

responsive to the determining that the first threshold time has elapsed since the launching of the transaction monitoring application, stopping execution of the transaction monitoring application;

after the stopping of the execution of the transaction monitoring application, relaunching the transaction monitoring application;

after the relaunching of the transaction monitoring application, accessing, by the transaction monitoring application, second targeted transaction data from the targeted transaction persistent storage, the second targeted transaction data describing at least one targeted transaction data that differs from the targeted transaction parameters described by the first targeted transaction data;

building, by the transaction monitoring application, a second targeted transaction data structure comprising at least a portion of the targeted transaction parameters described by the second targeted transaction data; and storing, by the transaction monitoring application, the second targeted transaction data structure to a memory location.

16. The non-transitory machine-readable medium of claim 15, the operations further comprising:

executing an interface application at the at least one processor;

receiving, by the interface application, an indication of at least one targeted transaction parameter; and writing, by the interface application, the at least one targeted transaction parameter to the targeted transaction persistent storage.

17. The non-transitory machine-readable medium of claim 15, the sending of the first transaction report message comprising:

writing, by the transaction monitoring application, first transaction report data to a report persistent storage;

launching a message application to execute on the at least one processor;

reading, by the message application and from the report persistent storage, the first transaction report data;

generating, by the message application, the first transaction report message using the first transaction report data; and initiating, by the message application, sending of the first transaction report message.

18. The non-transitory machine-readable medium of claim 15, the operations further comprising:

periodically determining, by a scheduler application, whether the transaction monitoring application is executing; and when the transaction monitoring application is not executing, initiating, by the scheduler application, the launching of the transaction monitoring application.

19. The non-transitory machine-readable medium of claim 15, the operations further comprising:

accessing, by a queuing application and from a transaction execution system, the transaction record data stream; and generating, by the queuing application, a transaction record queue, the accessing of the first transaction record by the transaction monitoring application comprising accessing the transaction record queue.

20. The non-transitory machine-readable medium of claim 15, the targeted transaction parameters described by the first targeted transaction data comprising an indication of a first account and an indication of a first security.

* * * * *